(12) United States Patent
Templeman et al.

(10) Patent No.: US 10,128,475 B2
(45) Date of Patent: *Nov. 13, 2018

(54) INTEGRATED BATTERY AND VIBRATION AND/OR SHOCK ISOLATION ASSEMBLY

(71) Applicant: MARINE DYNAMICS, INC., Lenexa, KS (US)

(72) Inventors: Jon Clayton Templeman, Lenexa, KS (US); Brock Christian Templeman, Lenexa, KS (US)

(73) Assignee: Savior Products, Inc., Lenexa, KS (US)

( * ) Notice: Subject to any disclaimer, the term of this patent is extended or adjusted under 35 U.S.C. 154(b) by 179 days.

This patent is subject to a terminal disclaimer.

(21) Appl. No.: 15/243,520

(22) Filed: Aug. 22, 2016

(65) Prior Publication Data

US 2017/0054120 A1    Feb. 23, 2017

Related U.S. Application Data

(60) Provisional application No. 62/207,791, filed on Aug. 20, 2015.

(51) Int. Cl.
    *H01M 2/10*    (2006.01)

(52) U.S. Cl.
    CPC ....... *H01M 2/1094* (2013.01); *H01M 2/1077* (2013.01); *H01M 2/1083* (2013.01)

(58) Field of Classification Search
    CPC .................. H01M 2/1077; H01M 2/1083
    See application file for complete search history.

(56) References Cited

U.S. PATENT DOCUMENTS

| 5,534,364 A * | 7/1996 | Watanabe | B60L 3/0046 |
| | | | 180/65.1 |
| 6,643,122 B1 * | 11/2003 | Fontana | H01M 2/1077 |
| | | | 312/223.1 |
| 9,899,648 B2 * | 2/2018 | Templeman | H01M 2/1083 |
| 2011/0068035 A1 * | 3/2011 | Egan | B65D 19/18 |
| | | | 206/523 |

FOREIGN PATENT DOCUMENTS

KR    2019930016308    *    3/1997

* cited by examiner

*Primary Examiner* — Stewart A Fraser
*Assistant Examiner* — Rachel L Zhang
(74) *Attorney, Agent, or Firm* — Hovey Williams LLP

(57) ABSTRACT

An integrated battery and shock and/or vibration isolation assembly broadly comprising a battery and an isolation assembly. The isolation assembly broadly comprises a battery support tray and a number of shock absorbing elements. The shock absorbing elements are positioned between the battery and battery support tray and each include a shock absorbing portion configured to mechanically isolate the battery from vibrations and/or shocks transferred from a vehicle, other machine, or operating environment.

20 Claims, 5 Drawing Sheets

INTEGRATED BATTERY AND VIBRATION AND/OR SHOCK ISOLATION ASSEMBLY

RELATED APPLICATIONS

This patent application is a regular utility non-provisional patent application and claims priority benefit with regard to all common subject matter of earlier-filed U.S. Provisional Patent Application Ser. No. 62/207,791 titled "Integrated Battery and Vibration and/or Shock Isolation Assembly", filed Aug. 20, 2015. The earlier-filed provisional patent application is hereby incorporated by reference in its entirety into the present application.

BACKGROUND

Vehicles such as cars, boats, and motorcycles typically include one or more batteries for storing and providing electrical power. These batteries often fail or have reduced performance due to excessive vibrations and shocks generated or transmitted by the vehicles and/or the operating environment. This is especially true for batteries used in boats, personal watercraft, all-terrain vehicles, and other vehicles that operate in rough water or uneven terrain. All types of batteries, and particularly absorbent glass mat (AGM) batteries, gel cell batteries, spiral cell batteries, and Lithium batteries, are expensive, difficult to replace, and difficult to safely dispose and recycle. Thus, enabling batteries to live up to their full potential is highly desired.

Conventional battery holders such as battery boxes or trays secure their batteries to the vehicles but often do not absorb vibrations and shocks transmitted or generated by the vehicles and/or the operating environment. Shock and/or vibration absorbing pads may be placed under the batteries, but such pads do not secure the batteries to their vehicles. The batteries may be strapped onto or otherwise secured to the vehicles while they are on the shock and/or vibration absorbing pads, but doing so eliminates much of the benefits of the shock and/or vibration absorbing pads because the traditional mounting mechanisms compress the pads such that vibrations and shocks travel through the traditional mounting mechanisms into the batteries and/or negate or minimize the material's shock and/or vibration absorption effectiveness.

Another problem with conventional shock and/or vibration absorbing pads, battery holders, and the like is that they are typically "add-on" or aftermarket devices that consumers often do not purchase when purchasing batteries. These add-on or aftermarket devices may also require vehicular modification during installation, which consumers may not be capable of or comfortable with doing.

SUMMARY

The present invention solves the above-described problems and provides a distinct advance in the art of battery holders. More particularly, the present invention provides an integrated battery and shock and/or vibration isolation assembly in which some embodiments of the battery can be replaced without the use of tools. The shock and/or vibration isolation assembly is integrated with the battery such that the battery and the shock and/or vibration isolation assembly form essentially one complete, easily replaceable unit.

An embodiment of the integrated battery and shock and/or vibration isolation assembly broadly comprises a battery and an isolation assembly. The battery includes a shell having a bottom and a sidewall and a lid extending across the top of the shell. The bottom includes a number of fasteners, fastener openings, or connective features for connecting the battery to the isolation assembly. The sidewall extends upwards from edges of the bottom such that the bottom and sidewall cooperatively form an interior cavity for retaining internal battery components therein. The lid and/or the sidewall may include a positive terminal and a negative terminal.

The isolation assembly broadly comprises a battery support tray and a number of shock absorbing elements. Importantly, in some configurations, the battery support tray is removably connectable to a mounting plate, mounting block, or other component (e.g., a vehicle mounting plate) without the use of tools. The shock absorbing elements are positioned between the battery and the battery support tray and each include a shock absorbing portion, a lower fastener or connecting feature, and an upper fastener or connecting feature. The lower fastener or connecting feature connects the shock absorbing element to the battery support tray. The upper fastener or connecting feature connects the shock absorbing element to the bottom of the battery shell. The lower fastener or connecting feature and upper fastener or connecting feature are spaced apart from each other by the shock absorbing portion so as to mechanically isolate the battery shell from vibrations and/or shocks transferred from a vehicle, other machine, or operating environment. The shock and/or vibration absorbing elements may be integrated with the bottom of the battery shell and/or the battery support tray during manufacturing and/or assembly process without the need for mechanical fasteners.

Another embodiment of the integrated battery and shock and/or vibration isolation assembly broadly comprises a battery and isolation assembly similar to the components described above and a vehicle mounting plate. The vehicle mounting plate is configured to removably receive the battery support tray thereon. The vehicle mounting plate may be attached to a mounting point of the vehicle or may be integrated with the vehicle.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

DESCRIPTION

The present invention solves the above-described problems and provides a distinct advance in the art of vibration and/or shock isolation devices for batteries. More particularly, the present invention provides a vibration and/or shock isolation assembly that is integrated into a battery and that both secures the battery to a vehicle and isolates the battery from many shocks and vibrations from the vehicle and/or operating environment. It will be understood that the terms "shock" and "vibration" are used interchangeably herein and include shocks, vibrations, jarring, natural oscillations, and/or any other kind of undesirable movement.

Figure 1:
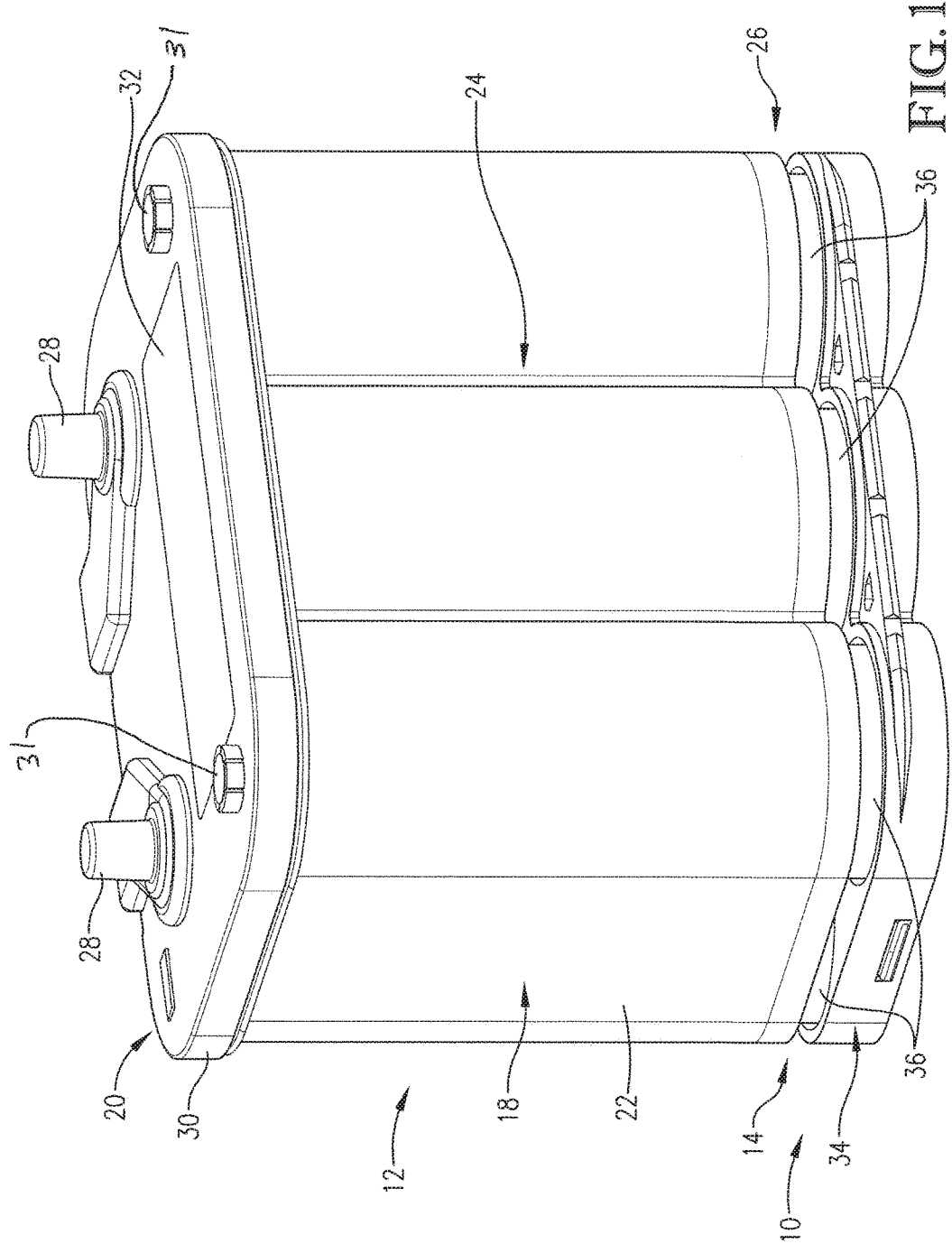
FIG. 1 is a perspective view of an integrated battery and isolation assembly constructed in accordance with an embodiment of the present invention.
Figure 2:
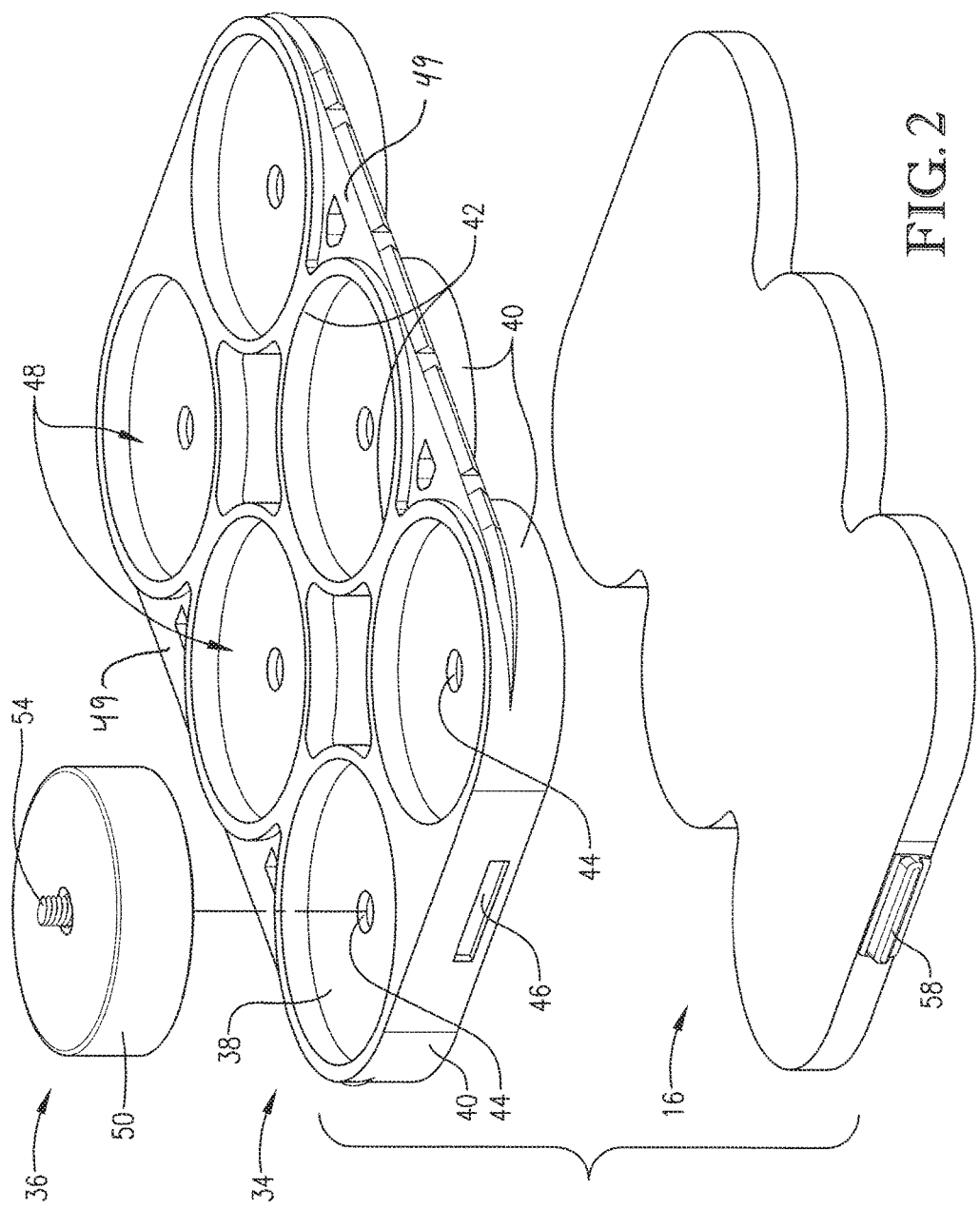
FIG. 2 is a perspective exploded view of the isolation assembly of FIG. 1.
Figure 3:
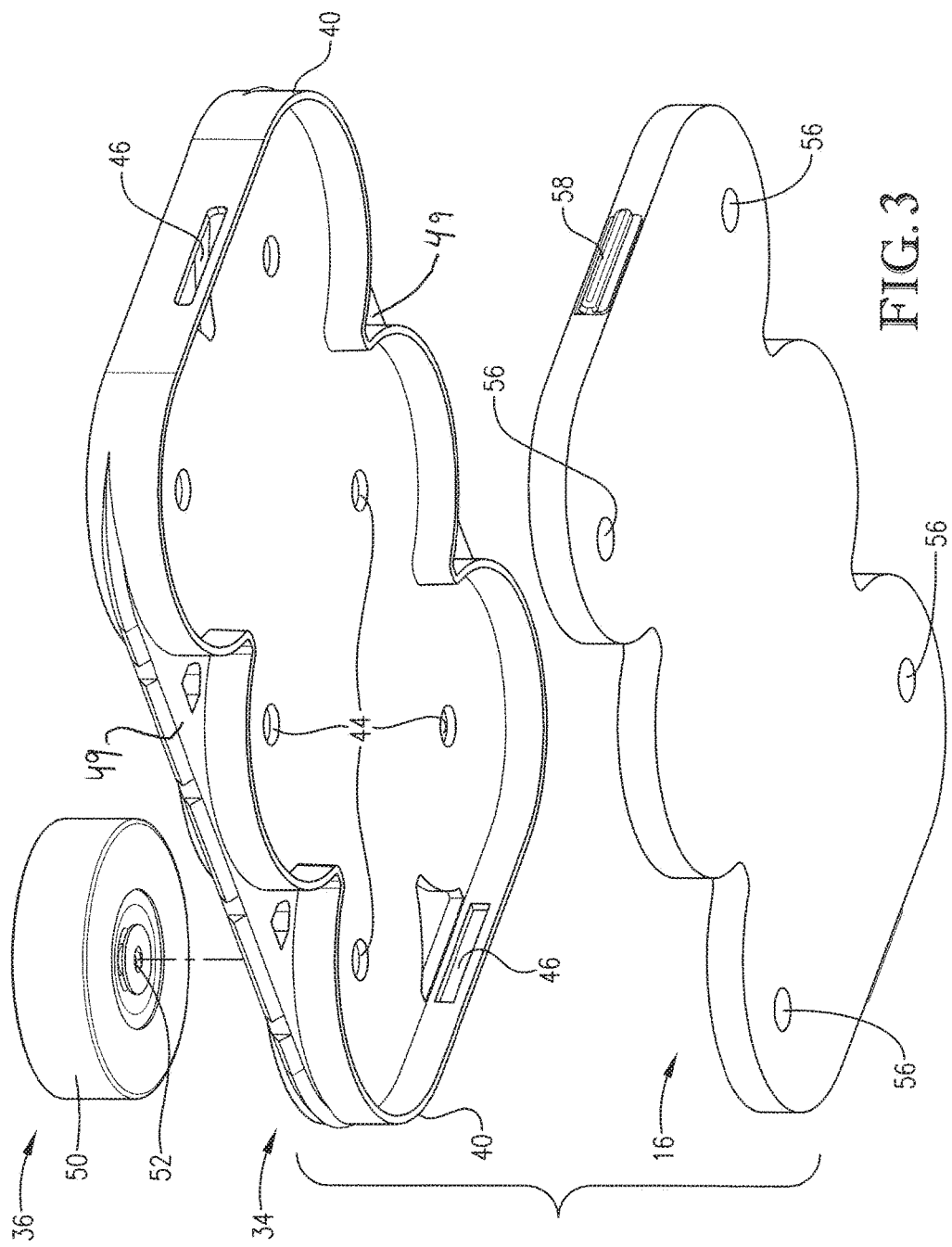
FIG. 3 is a bottom perspective exploded view of the isolation assembly of FIG. 1.

Turning to FIGS. 1-3, an integrated battery and vibration and/or shock isolation assembly 10 constructed in accordance with an embodiment of the invention broadly includes a vehicle battery 12, an isolation assembly 14 integrated onto the battery 12, and an optional vehicle mounting plate 16 for mounting the battery 12 and isolation assembly 14 onto a vehicle.

The battery 12 is mostly conventional and includes a battery shell 18 and a battery lid 20. The battery shell 18 may retain battery plates, fluid, and/or other battery components, and may include a sidewall 22 that may have a number of side contours 24 and a flat bottom 26 having a number of fasteners, fastener openings, or connecting features that are molded, drilled, or otherwise formed in and/or attached to the bottom 26 of the shell 18. In one embodiment, the fasteners are internally threaded female-type bolt or screw retainers integrated into the bottom 26 of the shell 18. In another embodiment, the fasteners are male threaded studs or bolts extending downwardly from the bottom 26 of the shell 18. In another embodiment, the connecting features are molded posts extending downwardly from the bottom 26. In yet another embodiment, the connecting features are pockets or cavities integrated into the bottom 26.

The side contours 24 of the shell 18 may correspond with the number of shock absorbing elements of the isolation assembly 14 (described below) and in one embodiment may include six partially cylindrical sections. However, the battery shell may have any suitable size and shape.

The battery lid 20 covers the battery shell 18 and may include positive and negative terminals 28 and snaps, tabs, an outer lip 30, and/or other fasteners for connecting the lid 20 to the shell 18. The lid 20 may be configured to form a seal with the shell 18 to retain battery fluid and/or other battery components in the interior chamber of the battery shell 18. The lid 20 may also include vents 31 for venting the interior chamber and removable caps 32 or other openings for allowing the battery fluid to be checked without removing the lid 20.

The isolation assembly 14 is integrated into the bottom of the battery 12 and isolates the battery 12 from vibrations and/or shocks generated by and/or received from the vehicle and/or operating environment. One embodiment of the isolation assembly 14 may include a battery support tray 34 and one or more shock absorbing elements 36 positioned between the battery support tray 34 and the bottom 26 of the battery 12. The isolation assembly 14 may be pre-assembled with the battery 12 or may be assembled and attached to the battery 12 after the battery 12 is manufactured.

The battery support tray 34 receives and supports the shock absorbing elements 36 and in one embodiment may include a floor 38, a lower outer lip 40, a number of upper divider lips 42, and a number of shock absorber fastener holes 44. The lower outer lip 40 may extend from the floor 38 at least partially around the bottom of the battery support tray 34 and may include a number of slots 46 for receiving mounting tabs of the vehicle mounting plate 16. The upper divider lips 42 may extend upwardly from the floor 38 so as to form shock absorber wells 48 for receiving the shock absorbing elements 36 therein. The shock absorber wells 48 may be circular or any other shape and may correspond to the shape of the shock absorbing elements 36. In one embodiment, the upper divider lips 42 form six shock absorber wells 48 in a 2×3 arrangement. The shock absorber fastener holes 44 receive shock absorber fasteners therethrough and may extend through the floor 38 in the centers of the shock absorber wells 48 for securing a shock absorbing element 36 in each shock absorber well 48. Alternatively, the battery support tray 34 may be a substantially flat plate or any other suitable plate or tray. The battery support tray 34 may be specifically shaped according to a particular battery brand or type of battery. Alternatively, the battery support tray 34 may be configured to support batteries of more than one brand or type.

The battery support tray 34 may also include mounting bosses 49 instead of or in addition to the lower outer lip 40 and slots 46. The mounting bosses 49 may extend from the battery support tray 34 and are configured for securing or fastening the battery support tray 34 to a mounting block, mounting bracket, or other mounting component of the vehicle.

The shock absorbing elements 36 are placed in the shock absorber wells 48 to isolate the battery 12 from vibrations and shocks generated or transmitted by the vehicle and/or operating environment. Each shock absorbing element 36 may include a shock absorption portion 50, a lower fastener 52, and an upper fastener 54. The shock absorption portion 50 absorbs the vibrations and shocks generated or transmitted by the vehicle and may be formed of Sorbothane® material, rubber, or other suitable material.

The lower fastener 52 may be a female-type threaded receptacle embedded in the bottom of the shock absorption portion 50 for receiving a bolt or similar fastener extending from the battery support tray 34. Alternatively, the lower fastener 52 may be a male-type threaded or stud fastener or any other suitable fastener or connecting feature embedded into the bottom of the shock absorption portion 50.

The upper fastener 54 may be a male-type threaded, stud fastener, or other connecting feature embedded into the top of the shock absorption portion 50 and extending upwardly for being inserted into the fastener holes of the battery shell 18. Alternatively, the upper fastener 54 may be a female-type threaded receptacle or other connecting feature embedded in the top of the shock absorption portion 50 for receiving a bolt, stud, or similar fastener or connecting feature extending from the battery 12.

Importantly, the lower fastener 52 or connecting feature and the upper fastener 54 or connecting feature do not touch and are separated from each other by the shock absorption portion 50. This prevents vibrations and shocks from being transmitted through the fasteners 52, 54 to the battery 12. Instead, vibrations and shocks are at least dampened by the material in the shock absorption portion 50.

The shock absorbing elements 36 may be disc-shaped or any other suitable shape and may be Sorbothane® Stud Mounts, rubber, or other suitable component. The shock absorbing elements 36 may be positioned between the battery support tray 34 and the bottom 26 of the battery shell 18 in the shock absorber wells 48 of the battery support tray

34. More specifically, the shock absorbing elements 36 may be positioned in line with the fastener holes of the battery support tray 34 and the fastener holes of the bottom 26 of the battery shell 18. In one embodiment, the integrated battery and vibration and/or shock isolation assembly 10 includes six shock absorbing elements 36 arranged in a 2×3 arrangement. The shock absorbing elements or element may be any suitable number, size, and shape and may be unique. The shock absorbing fasteners or connecting features may have any suitable type of connection such as threaded female or male bolts or screws or other connecting mechanisms and/or features.

The vehicle mounting plate 16 secures the integrated battery and vibration and/or shock isolation assembly 10 on a surface or mounting component of the vehicle. The vehicle mounting plate 16 may mirror the contours of the battery support tray 34 and may include a number of fastener holes 56 and a number of mounting tabs 58. The fastener holes 56 may be positioned near edges or corners of the vehicle mounting plate 16 for rigidly securing the vehicle mounting plate 16 to the vehicle via vehicle mounting fasteners (e.g., bolts, screws, rivets, or other fasteners) inserted through the fastener holes 56. In one embodiment, the vehicle mounting plate 16 includes four fastener holes 56 positioned near the corners of the vehicle mounting plate 16. The mounting tabs 58 secure the battery support tray 34 to the vehicle mounting plate 16 and each may extend outwardly from near edges of the vehicle mounting plate 16 for engaging the slots 46 of the battery support tray 34. The mounting tabs 58 may be spring-loaded for easily attaching and detaching the battery support tray 34 to and from the vehicle mounting plate 16 without the use of tools. The vehicle mounting plate 16 may be formed of corrosion resistant billet aluminum, molded plastic, or any other suitable material. It will be understood that the vehicle mounting plate 16 may instead be part of the vehicle or integrated into the vehicle itself. The vehicle mounting plate 16 may be shaped specifically for a particular brand of battery or a specific battery type. Alternatively, the vehicle mounting plate 16 may be configured to engage a number of different battery support trays 34. The battery support tray 34 may be secured to the vehicle mounting plate 16 in any number of ways such as threaded screws, straps, clamps, or any other suitable means of connection. In one embodiment, the vehicle mounting plate 16 may be formed of two sub-plates snapped together.

It will be understood that the above-described components may be fastened via co-molding, adhesive mounting, or any other suitable fastener, connector, or mounting system so long as the shock absorption portions 50 of the shock absorbing elements 36 isolate the battery 12 from the vehicle mounting plate 16 such that the shock absorbing elements 36 dampen shocks and/or vibrations and/or prevent them from reaching the battery 12. For example, the following fasteners and/or securing mechanisms may be used: Velcro®, snap buttons, adhesive, co-molding, zippers, flip clamps, screws, push and turn locks, channel slides (optionally with push-button releases), male and female mating locks, turn locks, key hole locks, zip ties, straps and buckles, string or rope knots, bungie ropes with hooks, padlocks, bolts and nuts, welds, suction components, vertical channel slides with pins and/or buttons, sockets, rubber stretch attachments, threaded rods, or any other suitable mechanical components.

The above-described isolation assembly 14 may be assembled with the battery 12 as follows: first, the shock absorbing elements 36 may be attached to the bottom 26 of the battery shell 18 by screwing or inserting the upper fasteners 54 into the fastener holes of the bottom 26 of the battery shell 18. The battery 12 and the shock absorbing elements 36 may then be placed on the battery support tray 34 such that the shock absorbing elements 36 rest in the shock absorber wells 48 of the battery support tray 34. Bolts or similar fasteners may then be inserted upwards through the shock absorber fastener holes 44 of the battery support tray 34 and screwed into the lower fasteners 52 of the shock absorbing elements 36. The shock absorbing elements 36 may then be secured to the battery support tray 34 via the lower fasteners 52. It will be understood that equivalent male and female or other fastener configurations may be used. The vehicle mounting plate 16 may also be positioned on a battery mounting surface or bracket of the vehicle and fastened to the surface or bracket. The battery 12 and isolation assembly 14 may then be positioned on the vehicle mounting plate 16 such that the mounting tabs 58 of the vehicle mounting plate 16 are inserted into the slots 46 of the battery support tray 34. The mounting tabs 58 may need to be urged to a retracted position until the battery support tray 34 is in place. The battery 12 may be serviced or replaced by pushing the mounting tabs 58 inward and removing the battery 12 and isolation assembly 14 from the vehicle mounting plate 16 without taking the isolation assembly 14 apart or removing the vehicle mounting plate 16.

Alternatively, the integrated battery and vibration and/or shock isolation assembly 10 may be secured to the vehicle via the mounting bosses 49. The assembly 10 may be positioned on a mounting bracket or tray of the vehicle. Mounting blocks may then be positioned over the mounting bosses 49 and secured in place. It will be understood that the isolation assembly 10 may be secured to the vehicle via any other brackets, fasteners, or connecting means.

The above-described integrated battery and vibration and/or shock isolation assembly 10 (battery 12 and isolation assembly 14), including the associated mounting components, may be pre-assembled, marketed, and sold as a single product. The vehicle mounting plate 16 may be packaged and/or pre-assembled with the integrated battery and vibration and/or shock isolation assembly 10 or may be pre-installed with the vehicle. Alternatively, the integrated battery and vibration and/or shock isolation assembly 10 may be attached directly to the battery mounting surface or bracket of the vehicle. In either case, the consumer may need to make only a single purchase and, importantly, the need for a battery, and not the benefits of battery isolation, will largely be the impetus for the purchase.

The above-described integrated battery and vibration and/or shock isolation assembly 10 provides several advantages over conventional batteries, battery holders, isolation assemblies, and mounting systems. For example, the integrated battery and vibration and/or shock isolation assembly 10 both secures the battery 12 to the vehicle and protects the battery 12 from vibrations and shocks. That is, vibrations and shocks are dampened and/or prevented from being transmitted through the shock absorbing elements 36 to the battery 12 since the lower fasteners 52 and the upper fasteners 54 of the shock absorbing elements 36 are spaced apart from each other by the shock absorption portions 50 of the shock absorbing elements 36.

The integrated battery and vibration and/or shock isolation assembly 10 may be sold pre-assembled and thus does not need to be assembled by the consumer. The battery support tray 34 easily mounts to the vehicle mounting plate 16 without the need for tools. The integrated battery and vibration and/or shock isolation assembly 10 may be easily serviced and/or replaced by removing it from the vehicle mounting plate 16. The battery support tray 34 may be installed on virtually any vehicle via the vehicle mounting plate 16 or mounting bosses 49, thus making the integrated battery and vibration and/or shock isolation assembly 10 adaptable for any vehicle.

Figure 4:
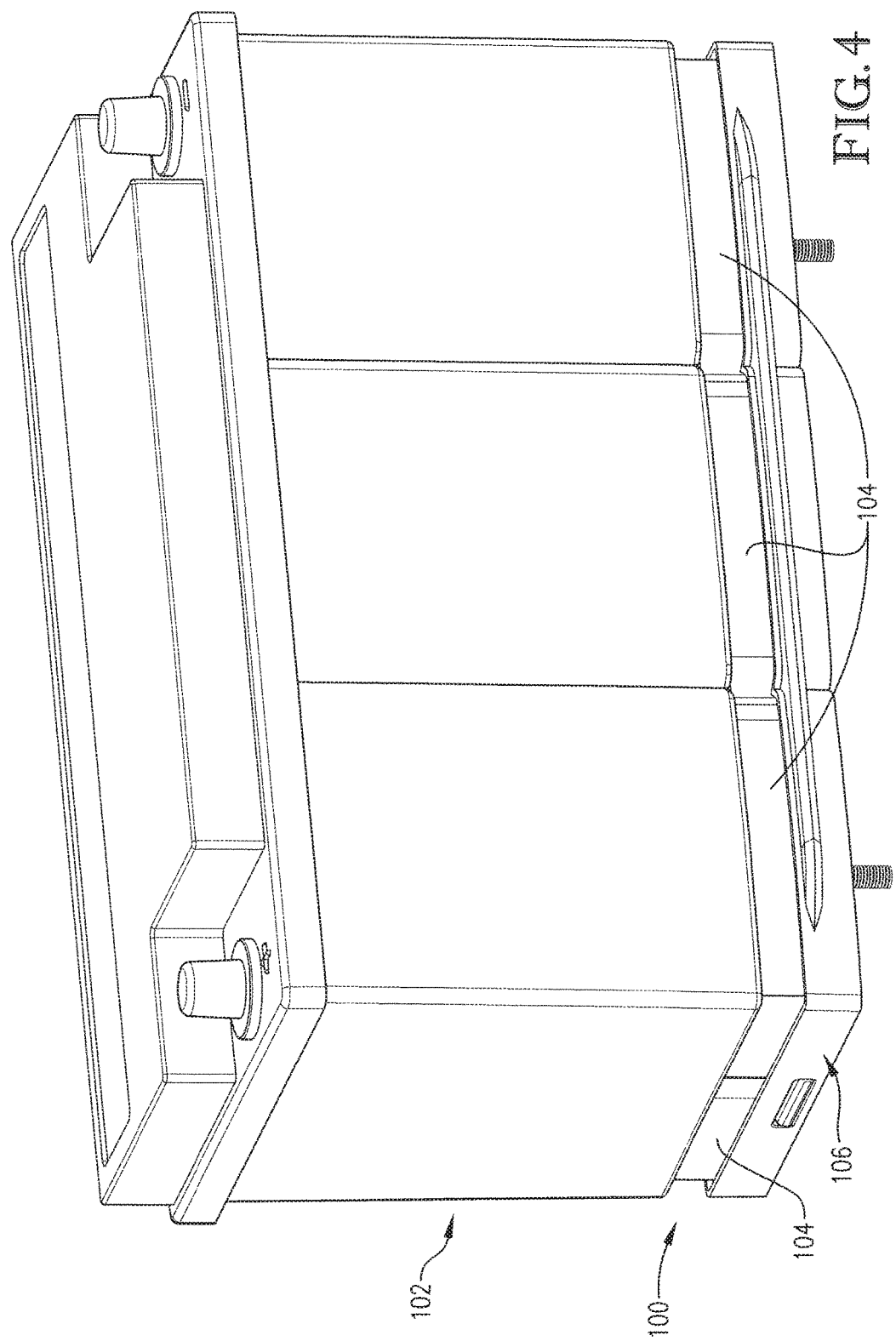
FIG. 4 is a perspective view of an integrated battery and isolation assembly constructed in accordance with another embodiment of the invention.
Figure 5:
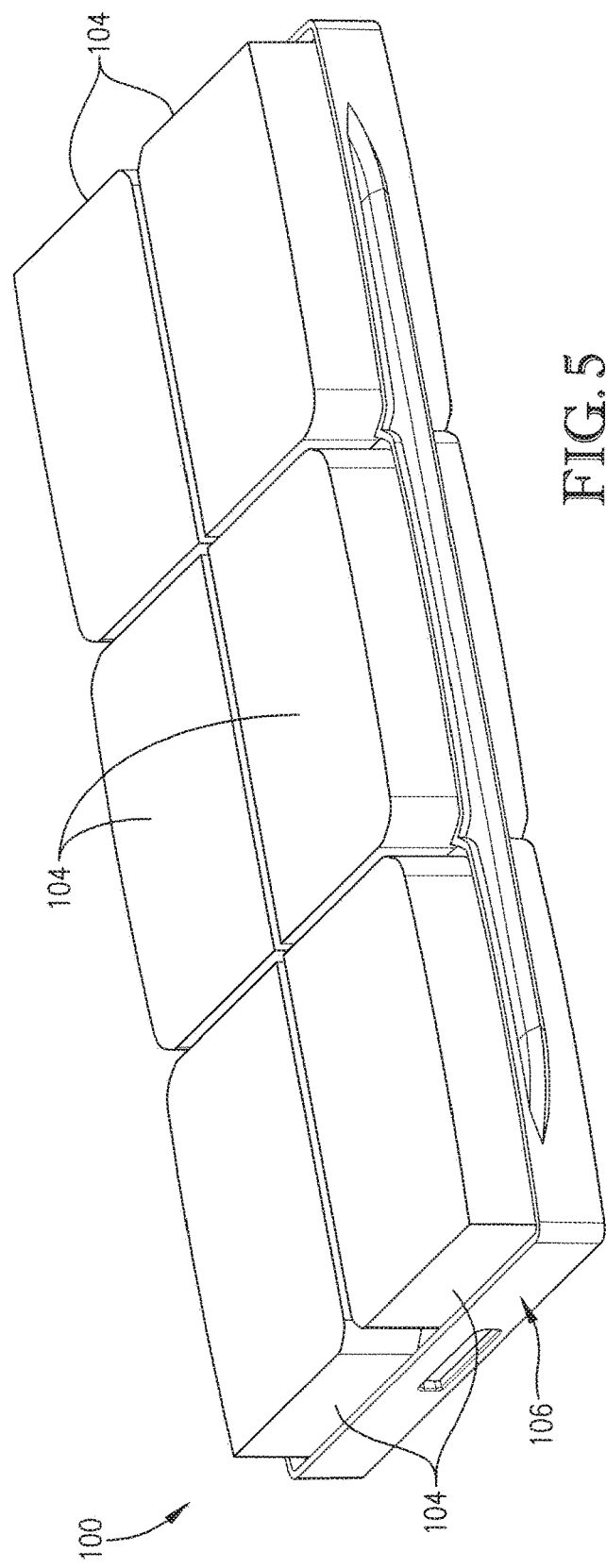
FIG. 5 is a perspective view of the isolation assembly of FIG. 4.

Another embodiment of the present invention is an integrated battery and vibration and/or shock isolation assembly 100 similar to the above-described integrated battery and vibration and/or shock isolation assembly 10 except that the battery shell 102, shock absorbing elements 104, and battery support tray 106 of the integrated battery and vibration and/or shock isolation assembly 100 have generally rectangular contours, as shown in FIGS. 4 and 5. For example, instead of having cylindrical or circular contours, the battery shell 102, shock absorbing elements 104, and battery support tray 106 may be formed of cubic or hyperrectangle shapes. This may maximize available space and may accommodate the current lead-acid battery interior components.

Yet another embodiment of the present invention is a quick-mount battery and vehicle mounting plate. The battery includes mounting bosses or similar geometry for mounting the battery on the vehicle mounting plate without tools. The vehicle mounting plate includes snaps, snap-pins, or similar integrated mounting hardware for releasably engaging the mounting bosses of the battery. To mount the battery on the vehicle mounting plate, a user may simply place the battery on the vehicle mounting plate. The mounting bosses of the battery may urge the snaps or snap-pins of the vehicle mounting plate out of the way until the battery is correctly positioned on the vehicle mounting plate. Alternatively, the snaps or snap-pins may need to be manually urged out of the way of the mounting bosses. To remove the battery from the vehicle mounting plate, the user may simply push the snaps or snap-pins in, thus freeing the mounting bosses of the battery. The user may then pull the battery off of the vehicle mounting plate while the snaps or snap-pins are pushed in. Upon battery replacement, the vehicle mounting plate may stay attached to the vehicle and the new battery may simply snap into the existing vehicle mounting plate.

Although the invention has been described with reference to the embodiments illustrated in the attached drawing figures, it is noted that equivalents may be employed and substitutions made herein without departing from the scope of the invention.

Having thus described various embodiments of the invention, what is claimed as new and desired to be protected by Letters Patent includes the following:

1. An integrated battery and shock and/or vibration isolation assembly comprising:
   a battery comprising:
      a shell including a bottom and a sidewall extending upwards from edges of the bottom such that the bottom and sidewall cooperatively form an interior cavity for retaining internal battery components therein;
      a lid positioned along a top of the sidewall; and
      a positive terminal and a negative terminal; and
   an isolation assembly comprising:
      a battery support tray configured to be connected to a vehicle and removed from the vehicle; and
      a shock absorbing element for absorbing shocks and vibrations received from the vehicle, the shock absorbing element forming the only physical connection between the battery and the battery support tray such that no unmitigated pathways exist for shocks and vibrations to reach the battery from the vehicle so that the battery is mechanically isolated from the vehicle.

2. The integrated battery and shock and/or vibration isolation assembly of claim 1, wherein the bottom of the shell includes female-type fasteners and the shock absorbing elements include male-type upper fasteners configured to be inserted into the female-type fasteners of the bottom of the battery shell.

3. The integrated battery and shock and/or vibration isolation assembly of claim 1, wherein the shock absorbing elements include male-type lower fasteners configured to be inserted into the battery support tray.

4. The integrated battery and shock and/or vibration isolation assembly of claim 1, wherein the shock absorbing elements are disc-shaped.

5. The integrated battery and shock and/or vibration isolation assembly of claim 1, wherein the shock absorbing elements are stud mounts.

6. The integrated battery and shock and/or vibration isolation assembly of claim 1, wherein the shock absorbing elements include six shock absorbing elements arranged in a 2 by 3 pattern.

7. The integrated battery and shock and/or vibration isolation assembly of claim 1, wherein the battery support tray includes a number of upper divider lips forming shock absorber wells for receiving the shock absorbing elements therein.

8. The integrated battery and shock and/or vibration isolation assembly of claim 1, wherein the battery support tray includes a mounting boss for securing the battery support tray to a mounting feature of the vehicle.

9. The integrated battery and shock and/or vibration isolation assembly of claim 1, wherein the battery support tray includes a lower outer lip for retaining the shock and/or vibration isolation assembly on a vehicle mounting plate.

10. The integrated battery and shock and/or vibration isolation assembly of claim 9, wherein the lower outer lip includes a number of slots for receiving mounting tabs of the vehicle mounting plate.

11. An integrated battery and shock and/or vibration isolation assembly comprising:
    a battery comprising:
       a shell including a bottom and a sidewall extending upwards from edges of the bottom such that the bottom and sidewall cooperatively form an interior cavity for retaining internal battery components therein;
       a lid positioned along a top of the sidewall; and
       a positive terminal and a negative terminal;
    an isolation assembly comprising:
       a battery support tray configured to be connected to a vehicle and removed from the vehicle; and
       a shock absorbing element for absorbing shocks and vibrations received from the vehicle, the shock absorbing element forming the only physical connection between the battery and the battery support tray such that no unmitigated pathways exist for shocks and vibrations to reach the battery from the vehicle so that the battery is mechanically isolated from the vehicle; and
    a vehicle mounting plate configured to removably receive the battery support tray thereon, the battery support tray being configured to be connected to the vehicle mounting plate and removed from the vehicle mounting plate without the use of tools.

12. The integrated battery and shock and/or vibration isolation assembly of claim 11, wherein the vehicle mounting plate has contours that match contours of the battery support tray.

13. The integrated battery and shock and/or vibration isolation assembly of claim 11, wherein the vehicle mounting plate includes a number of mounting tabs configured to positively secure the battery support tray on the vehicle mounting plate.

14. The integrated battery and shock and/or vibration isolation assembly of claim 13, wherein the battery support tray comprises a number of slots for receiving the mounting tabs.

15. The integrated battery and shock and/or vibration isolation assembly of claim 14, wherein the mounting tabs are biased so as to automatically engage the slots of the battery support tray when the battery support tray is positioned on the vehicle mounting plate.

16. The integrated battery and shock and/or vibration isolation assembly of claim 13, wherein each mounting tab is positioned near edges of the vehicle mounting plate.

17. The integrated battery and shock and/or vibration isolation assembly of claim 11, wherein the battery support tray includes a lower outer lip and the slots extend through the lower outer lip.

18. The integrated battery and shock and/or vibration isolation assembly of claim 11, wherein the vehicle mounting plate is configured to be fastened to a mounting point of the vehicle.

19. The integrated battery and shock and/or vibration isolation assembly of claim 11, wherein the vehicle mounting plate is integrated into the vehicle.

20. An integrated battery and shock and/or vibration isolation assembly comprising:
   a battery comprising:
      a shell including a bottom having a number of female-type threaded fasteners and a sidewall extending upwards from edges of the bottom such that the bottom and sidewall cooperatively form an interior cavity for retaining internal battery components therein;
      a lid positioned along a top of the sidewall; and
      positive terminal and a negative terminal;
   an isolation assembly comprising:
      a battery support tray including a lower outer lip and a number of female-type threaded fasteners on an upper surface of the battery support tray, the lower outer lip comprising a number of slots; and
      a number of shock absorbing elements each including:
         a cylindrical shock absorbing portion;
         a lower male-type threaded fastener configured to connect the shock absorbing element to the battery support tray via the female-type threaded fasteners on the upper surface of the battery support tray; and
         an upper male-type threaded fastener for connecting the shock absorbing element to the bottom of the battery shell via the female-type threaded fasteners of the battery shell, the lower male-type threaded fastener and the upper male-type threaded fastener of the shock absorbing element being spaced apart from each other by the shock absorbing portion such that the shock absorbing portion forms the only physical connection between the battery and the battery support tray so that no unmitigated pathways exist for shocks and vibrations to reach the battery from the vehicle so that the battery is mechanically isolated from the vehicle; and
   a vehicle mounting plate configured to removably receive the battery support tray thereon, the vehicle mounting plate comprising a number of outwardly extending mounting tabs configured to engage the slots of the lower outer lip of the battery support tray such that the battery support tray can be connected to and removed from the vehicle mounting plate without the use of tools.

* * * * *